(12) United States Patent
Balasubramaniyam

(10) Patent No.: US 11,838,653 B2
(45) Date of Patent: Dec. 5, 2023

(54) WIDE-ANGLE STREAMING MULTI-CAMERA SYSTEM

(71) Applicant: e-con Systems India Private Limited, Tamil Nadu (IN)

(72) Inventor: G. Balasubramaniyam, Chennai (IN)

(73) Assignee: E-CON SYSTEMS INDIA PRIVATE LIMITED, Tamil Nadu (IN)

( * ) Notice: Subject to any disclaimer, the term of this patent is extended or adjusted under 35 U.S.C. 154(b) by 0 days.

(21) Appl. No.: 17/592,277

(22) Filed: Feb. 3, 2022

(65) Prior Publication Data
US 2023/0247310 A1    Aug. 3, 2023

(51) Int. Cl.
*H04N 23/90* (2023.01)
*H04N 23/695* (2023.01)
*H04N 23/698* (2023.01)

(52) U.S. Cl.
CPC .......... *H04N 23/90* (2023.01); *H04N 23/695* (2023.01); *H04N 23/698* (2023.01)

(58) Field of Classification Search
CPC ... H04N 5/24; H04N 5/23299; H04N 5/23238
See application file for complete search history.

(56) References Cited

U.S. PATENT DOCUMENTS

| | | | | |
|---|---|---|---|---|
| 2014/0104378 A1* | 4/2014 | Kauff | ................. | G02B 27/143 |
| | | | | 348/38 |
| 2016/0381345 A1* | 12/2016 | Wu | ...................... | H04N 13/246 |
| | | | | 348/36 |
| 2020/0404243 A1* | 12/2020 | Saphier | .............. | G01B 11/2513 |
| 2022/0183583 A1* | 6/2022 | Sasaki | .............. | G01R 33/56509 |

FOREIGN PATENT DOCUMENTS

CN          107105219       *  8/2017

* cited by examiner

*Primary Examiner* — Kathleen V Nguyen
(74) *Attorney, Agent, or Firm* — Porter Wright Morris & Arthur LLP

(57) ABSTRACT

Our present invention relates to a 180 degrees wide angle multi-camera system with the following unique features. The cameras are placed diagonally and facing inwards (100, 101, 102). The cameras are rotated 90 degrees around their optical axes to provide higher FOV for a wider view (302). In the illustrated embodiment of our invention, three cameras are placed in an inward position at particular angles to each other (105) to reduce the blind spot, parallax error and closer working distance. The multiple cameras are placed in an inward position and to avoid the adjacent camera in preview, each camera is placed diagonally. The inward position ensures the high horizontal FOV (202). The illustrated embodiment of our invention can be used in high Horizontal FOV and high Vertical FOV required applications.

3 Claims, 2 Drawing Sheets

90°

WIDE-ANGLE STREAMING MULTI-CAMERA SYSTEM

FIELD OF INVENTION

This invention comes under the field of calibration of cameras, more specifically to the field of camera placement to have better field of view, lower parallax error and to effectively reduce blind spots. This invention relates to a three-camera system which are placed in a particular arrangement to provide a wide angle of streaming, while producing minimal parallax error or blind spots.

BACKGROUND OF THE INVENTION

In the field of photography, cinematography, astronomy, traffic management, ADAS, security and surveillance, and other fields, the placement of cameras is one of the critical aspects for management. The height at which the cameras are placed, the resolution, the relative placement of the cameras, the relative arrangement of the cameras with respect to each other all play a very important role in ascertaining the quality, depth, clarity and usability of the images captured. The field of view is used to describe the extent of the observable visual environment in any given instant of time. There are horizontal and vertical field of view.

Parallax error can be defined as the error/displacement caused in in the apparent position of the object due to the viewing angle that is other than the angle that is perpendicular to the object. Parallax error is the difference in the actual image captured due to the differences in the position of the point of view/capture. It occurs due to the difference in the position of the camera viewfinder and the actual image taken by the camera. A blind spot can be defined as the points or specific areas of environment not covered by the camera systems used to monitor/film the particular environment.

The existing systems cameras are arranged in the same plane and face outwards. This arrangement of camera systems continues to present the monitored environment with some blind spots and parallax errors and do not cover the maximum possible area that should be covered due to such placements. The existing three camera systems are placed in outward position to create a high horizontal field of view, but in this position the parallax error and blind spot will increase, and the working distance will be long because of the blind spot errors.

Some of the existing systems that have tried to address this issue have been discussed below:

In U.S. Pat. No. 2,583,030A: Parallax correction for multi-lens cameras, which relates to multi-camera structures for taking pictures that are to be projected as individual images of a mosaic picture, and the invention relates more particularly to the elimination of mismatching at the edges of adjacent pictures. Another objective is to provide a multi-camera structure for taking mosaic pictures with focusing lenses, and for moving certain parts of the camera structure with respect to other parts automatically in response to focus changes and in directions that compensate for the parallax errors, induced by the changes in focus. By compensating for these parallax errors, perfect matching of the picture edges can be obtained for objects on which the lenses are focused.

In U.S. Pat. No. 9,843,723B2: Parallax free multi-camera system capable of capturing full spherical images, which relates to an imaging system which includes a front camera having a first field-of-view (FOV) in a first direction and an optical axis that extends through the first FOV, a back camera having an optical axis that extends through the first FOV, a plurality of side cameras disposed between the front camera and the back camera, a back light re-directing reflective mirror component disposed between the back camera and plurality of side cameras, the back light re-directing reflective mirror component further disposed perpendicular to the optical axis of the back camera, and a plurality of side light re-directing reflective mirror components, each of the plurality of side cameras positioned to receive light re-directed reflected from one of the plurality of light redirecting reflective mirror components.

The drawbacks in the present systems are:
Large parallax error;
Wide blind spot; and
Longer working distance due to blind spot errors.

To overcome the problems faced in the existing systems, the present invention implements the placement of cameras in an inward position and to avoid the adjacent camera in preview, the camera is placed diagonally. This present system consists of the unique placement of three cameras in a specific angle with reference to each other and with a rotated positioning to capture a wide FOV both in horizontal and vertical axis.

The advantages of our current invention over existing systems include:
   Since all the cameras are placed in an inward position they view the scene from the same viewpoint, parallax error is low;
   Decreased blind spot; and
   Closer working distance since the blind spot error is low.

OBJECTIVE OF THE INVENTION

The main objective of our system is to provide a camera positioning system for multi-camera systems to provide wide angle streaming with less parallax errors and less blind spot errors.

The secondary objective of our system is the positioning of the three cameras in inward position and to avoid the adjacent camera in preview and tilting at ninety degrees to create a high vertical field of view.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims and the abstract, as a whole.

The major problem addressed by the invention is towards the development of a multi-camera system that provides a wide area of coverage with less parallax errors and blind spots at a smaller working distance by the horizontal inward placement of the cameras at a particular angle to each other, with 90-degree rotation around each axis. The illustrated invention relates to three cameras which are positioned inwards to create a 180-degree horizontal field of view and to avoid the adjacent camera in preview, the camera is placed diagonally.

Due to the cameras placed diagonally, the setup height is large when compared to cameras placed on the same plane. Hence this system of cameras can be considered for all kinds of viewing systems that require wide angle viewing, a panoramic vision of the environment with seamless stitching of images and minimum blind spots and parallax errors.

BRIEF DESCRIPTION OF THE DRAWINGS

The manner in which the proposed system works is given a more particular description below, briefly summarized above, may be had by reference to the components, some of which is illustrated in the appended drawing It is to be noted; however, that the appended drawing illustrates only typical embodiments of this system and are therefore should not be considered limiting of its scope, for the system may admit to other equally effective embodiments.

Throughout the drawings, the same drawing reference numerals will be understood to refer to the same elements and features.

Figure 1:
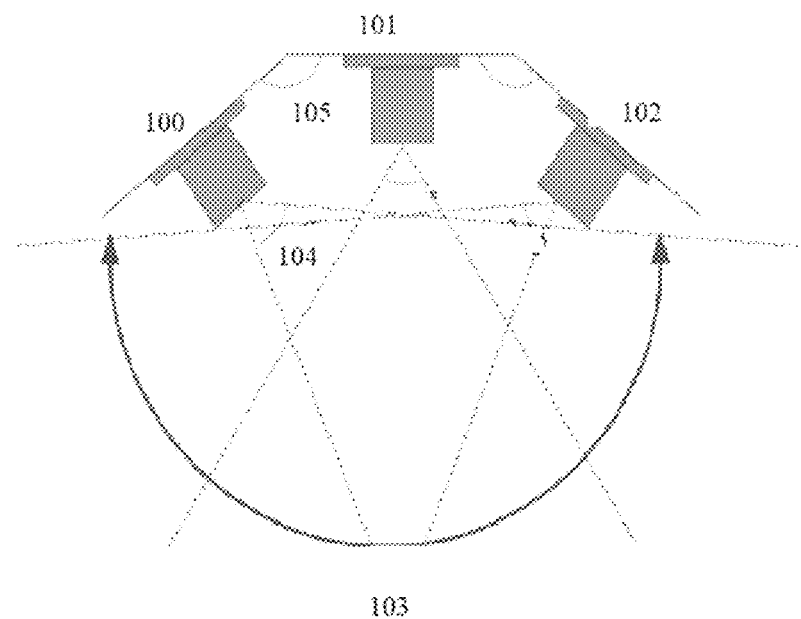
Figure 2:
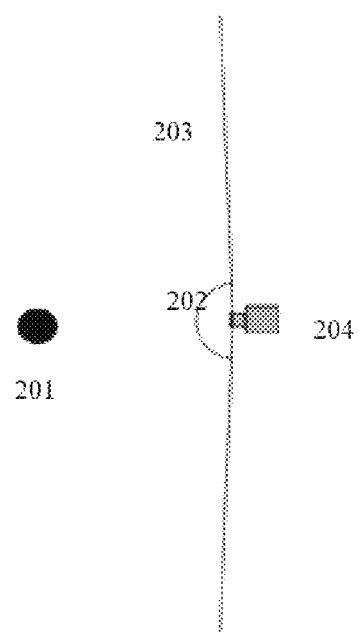
Figure 3:
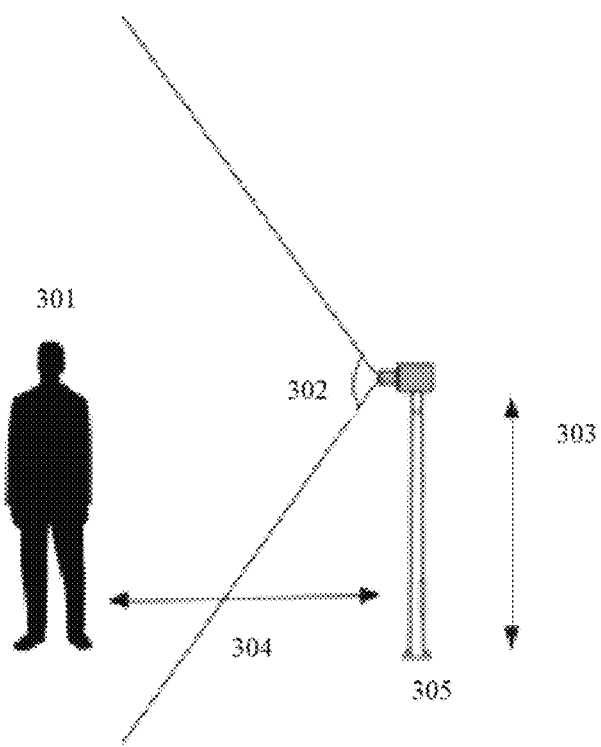

The features and advantages of the present proposed system will become more apparent from the following detailed description a long with the accompanying figures, which forms a part of this application and in which:

FIG. 1: Block Diagram describing the components and the workflow of our system in accordance with our present invention;

FIG. 2: Block Diagram describing the top view our multi camera system in accordance with our present invention;

FIG. 3: Block Diagram describing the side view of our multi camera system in accordance with our present invention; and FIG. 4: Diagram describing the placement of our multi camera system in accordance with our present invention.

REFERENCE NUMERALS

100 Camera 1
101 Camera 2
102 Camera 3
103 180 degrees HFOV
104 70 degrees viewing angle
105 30 degrees inward placement angle
201 Top view of object
202 180 degrees HFOV
203 Wide angle coverage
204 180 degrees camera system
301 Object in side view
302 100 degrees VFOV
303 5 feet high camera placement
304 The distance between the object and the camera system
305 The 180 degrees multi-camera system
401 Camera 1
402 Camera 2
403 Camera 3

DETAILED DESCRIPTION OF THE INVENTION

The principles of operation, design configurations and evaluation values in these non-limiting examples can be varied and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are construed such that it provides a complete and a thorough understanding of the disclosed invention, by clearly describing the scope of the invention, for those skilled in the art.

The present invention relates to a system for a multi-camera solution that provides a 180° camera view. FIG. 1 describes the components and the working of the current embodiment of our system. One embodiment of our current invention camera system comprises three cameras (100, 101, 102) which are positioned inwards (104) to create a 180-degree horizontal field of view (103) and to avoid the adjacent camera in preview, the camera is placed diagonally relative to each other (105).

FIG. 2 describes the working of our system in a top view manner. The 180 degree camera (204) system provides a higher VFOV (202) of the object (201) in the environment.

In one embodiment of our invention, three cameras are used and all the three cameras are placed in an inward position to produce decreased blind spot and low parallax error and closer working distance and all the 3 cameras are rotatable 90 degree around its optical axis.

To overcome the issue of the existing systems regarding the higher number of parallax errors, blind spots and higher working distance, in our current invention, the multiple cameras are placed in an inward position and to avoid the adjacent camera in preview, each camera is placed diagonally. The inward position ensures the high horizontal FOV, to increase the vertical FOV the cameras are tilted by 90 degrees.

FIG. 3 describes the working of our system from the side view manner for one embodiment of our invention, to provide proper understanding of our system. The object (301) is viewed by our multi-camera system (305) which is placed at a height of 5 feet from the ground (303). The minimum distance between the object and the camera is also 5 feet (304) which is a closer working distance between the object and the camera system. The arrangement of cameras provides 100 degrees VFOV (302) of the environment.

On embodiment of our present invention relates to a 180 degrees wide angle camera system with the following unique features: The three cameras are placed diagonally and facing inwards. All the three cameras (100, 101, 102) are placed in an inward position to reduce the blind spot, parallax error and closer working distance. All the cameras are rotated 90 degrees around its optical axis to increase the vertical FOV and provide a wider view.

In one embodiment of our current invention, an arrangement of multiple cameras is configured, which in total provide 180 degrees of HFOV, for which the HFOV of each of the cameras is slightly more than (180/number of cameras used), in order to provide some overlap of images necessary for a visually seamless stitching of the individual images into a full 180 degree panorama.

In one embodiment of our current invention, an arrangement of three cameras is configured, which in total provide 180 degrees of HFOV, for which the HFOV of each of the cameras is slightly more than 60 degrees (180/3=60), in order to provide some overlap of images necessary for a visually seamless stitching of the individual images into a full 180-degree panorama.

Figure 4:
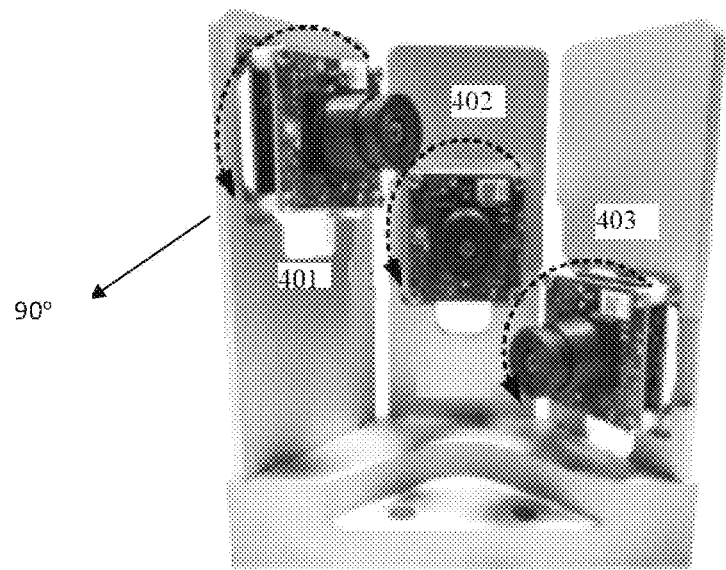

FIG. 4 shows how the cameras have been placed diagonally to each other and facing inwards at an angle and each camera rotates 90 degrees around their optical axes. In another embodiment of our present invention, the multiple camera systems can be a system comprising of two or more cameras (401, 402, 403) which are arranged in a horizontal line of arrangement, placed inwards at an angle (105) to each other and diagonally placed to ensure reduced blind spots, reduced parallax errors and wide coverage.

The illustrated embodiment of our invention can be used in the high Horizontal FOV and high Vertical FOV required applications like surround-view systems, sports vision and broadcasting, and data analytics using panoramic videos. Due to the cameras placed diagonally, the setup height is large when compared to cameras placed on the same plane.

Another embodiment of our invention can be applied for security and surveillance systems, satellite systems, and other systems which require a wide angle of coverage, lower blind spots and parallax errors.

One embodiment of our invention can be used for smart phone with multi-lens features, cinematography and related fields which require panoramic shots.

The advantages of the current embodiment of our invention are:
Decreased blind spot;
Low parallax error;
Closer working distance;
High horizontal field of view (HFOV); and
High Vertical field of view (VFOV).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A multi-camera system comprising:
   multiple cameras which are placed horizontally facing inwards at particular angles, in diagonal position to each other to provide 180-degrees of viewing; and
   all the cameras are rotatable 90 degrees around their optical axis to increase the vertical field of view (VFOV) and provide a wider view, wherein the arrangement of the multiple cameras, provides totally, 180 degrees of horizontal field of view (HFOV), for which the HFOV of each of the cameras is slightly more than (180/number of cameras used in the system) degrees to provide slight overlapping of images for seamless panoramic view.

2. The multi-camera system as claimed in claim 1, wherein the multiple cameras are placed in an inward position at particular angles to each other, and wherein each camera is positioned diagonally to avoid an adjacent camera in preview.

3. The multi-camera system as claimed in claim 1 wherein the arrangement of three cameras, provides totally, 180 degrees of HFOV, for which the HFOV of each of the cameras is slightly more than 60 degrees in order to provide for a visually seamless stitching of the individual images into a full 180-degree panorama.

* * * * *